United States Patent [19]

Koyama

[11] Patent Number: 4,465,171

[45] Date of Patent: Aug. 14, 1984

[54] COMPACT ELECTROMAGNETIC SPRING-WOUND CLUTCH

[75] Inventor: Kinichi Koyama, Kiryu, Japan

[73] Assignee: Ogura Clutch Co., Ltd., Kiryu, Japan

[21] Appl. No.: 366,195

[22] Filed: Apr. 7, 1982

[30] Foreign Application Priority Data

Apr. 10, 1981 [JP] Japan .................................. 56-54079
Sep. 3, 1981 [JP] Japan .......................... 56-131340[U]

[51] Int. Cl.³ ...................... F16D 27/10; F16D 13/08
[52] U.S. Cl. ................................ 192/81 C; 192/84 T; 192/110 R
[58] Field of Search ................. 192/56 C, 81 C, 84 T, 192/110 R, 41 S; 188/77 W, 163; 267/155, 58

[56] References Cited

U.S. PATENT DOCUMENTS

| 2,468,193 | 4/1949 | Goff | 192/56 C |
| 2,541,947 | 2/1951 | Starkey | 192/56 C |
| 3,185,276 | 5/1965 | Sajovec | 192/84 T |
| 4,201,281 | 5/1980 | MacDonald | 192/84 T |

FOREIGN PATENT DOCUMENTS

56-54493 12/1981 Japan .

Primary Examiner—Rodney H. Bonck
Assistant Examiner—James J. Merek

Attorney, Agent, or Firm—Frishauf, Holtz, Goodman & Woodward

[57] ABSTRACT

An electromagnetic spring-wound clutch includes a first rotary member formed of a hub having an annular flange and a tubular portion integrally combined with the hub and adapted for direct coupling to a rotary shaft of an apparatus for use with the clutch. The tubular portion of the first rotary member is concentrically and rotatably fitted through a stationary annular field core which accommodates an electromagnetic coil and is arranged in facing relation with the annular flange of the hub. A non-magnetic annular member is rigidly fitted on the hub, and an armature is rotatably fitted on the hub and interposed between the annular flange and the annular member. A coil spring is wound around the annular member and a second rotary member rotatably fitted on the tubular portion of the first rotary member, for gripping engagement therewith. A covering member is disposed over the second rotary member, the coil spring and the armature member and secured to the second rotary member in a manner permitting adjustment of its circumferential position. The covering member has its peripheral wall formed with an opening which is engaged by a radial protuberance formed on the armature member and has a larger circumferential size than that of the radial protuberance.

11 Claims, 2 Drawing Figures

COMPACT ELECTROMAGNETIC SPRING-WOUND CLUTCH

BACKGROUND OF THE INVENTION

This invention relates to improvements in or to an electromagnetic spring-wound clutch.

An electromagnetic spring-wound clutch is well known which comprises: an input rotary member and an output rotary member arranged concentrically with each other; an armature member disposed for magnetically frictional engagement with one of the two rotary members; an electromagnetic coil operable when excited to cause the magnetically frictional engagement of the armature member with the one rotary member; and a coil spring having one end engaging the armature member and the other end with the other rotary member, respectively, and disposed for gripping engagement with the two rotary members. When the armature member is magnetically attracted and drawn to the above one rotary member, the coil spring is wound up into gripping engagement with the two rotary members to cause driving coupling between them.

More specifically, as known e.g. from Japanese Patent Publication No. 56-54493, a typical electromagnetic spring-wound clutch of this type comprises: a retainer member adapted for coupling to a framework of an apparatus for use with the clutch; a first rotary member (hub) rotatably supported on the retainer member; a field core/electromagnetic coil assembly accommodated within the first rotary member and supported by the retainer member; a second rotary member arranged at one end of the first rotary member and having a tubular boss adapted for coupling to a rotary shaft of the above apparatus; an armature member interposed between the two rotary members; and a coil spring having one end engaging with the second rotary member and the other end with the armature member, respectively.

According to this conventional electromagnetic spring-wound clutch, the first rotary member or hub is fitted, via a radial ball bearing or the like, on the retainer member which is arranged around the rotary shaft of the apparatus. Further, the hub is adapted to be coupled to a driving means or a driven means via a pulley formed on its outer periphery or a like means. Still further, the hub is formed therein with an internal space accommodating the field core/electromagnetic coil. Therefore, the hub has a very large radial size. In addition, to increase the torque transmission efficiency of the electromagnetic spring-wound clutch, the sizes of the electromagnetic coil and the field core have to be increased, and also the area of engagement of the coil spring with the first and second rotary members on which the former is grippingly wound up has to be increased. In the former case, the first rotary member or hub has a limited space for accommodating the field core/electromagnetic coil assembly having an increased size, and in the latter case, an increase in the above engaging area will necessitate an increase in the axial size of the clutch.

However, in recent years electromagnetic spring-wound clutches of this kind have been widely used in electronic copying machines, electronic computers and various automated apparatus. It is a general recent tendency that those apparatus become more compact in size. To this end, electromagnetic spring-wound clutches for use with these apparatus are required to satisfy two incompatible requirements at the same time, that is, they should have high torque transmission efficiency and their sizes should be as small as possible.

On the other hand, electromagnetic spring-wound clutches of this kind are arranged such that a coil spring is wound on two rotary members having exactly the same outer diameter or almost the same outer diameter for gripping engagement therewith to achieve driving coupling therebetween. A period of time required for obtaining this driving coupling through gripping winding of the spring determines the coupling period of time of the clutch that is a period of time from the start of energizing the coil to the start of torque transmission.

This coupling period of time is determined by the clearance between the inner peripheral surface of the coil spring in a non-gripping state and the outer peripheral surface of the gripping engaging portions of the two rotary members. Therefore, in designing a clutch, the above clearance is set to such a value as obtains a desired coupling period of time.

Therefore, a completed clutch operates with a constant coupling period of time irrespective of load conditions of apparatus for use with the clutch, and therefore it cannot always satisfy requirements of a variety of apparatus intended for use with the clutch.

OBJECTS AND SUMMARY OF THE INVENTION

It is an object of the invention to provide an electromagnetic spring-wound clutch which can have a largely reduced radial size without an increase in its axial size and therefore can be mounted even in a small mounting space without difficulty.

It is another object of the invention to provide an electromagnetic spring-wound clutch which permits easy changing of the clearance between the inner peripheral surface of the coil spring in a non-gripping state and the outer peripheral surfaces of the rotary members on which the spring is to be grippingly wound up, thus enabling adjustment of the coupling period of time.

According to the present invention, a first rotary member has a tubular portion and an annular enlarged portion radially outwardly extending from the tubular portion at an intermediate location of the tubular portion. The enlarged portion has one end formed with an annular radial flange. A stationary field core, which carries an electromagnetic coil therein, is arranged at the above one end of the enlarged portion of the first rotary member. The field core has a central through hole through which is rotatably fitted the tubular portion of the first rotary member in a manner concentric with the field core. A second rotary member is arranged at the other end of the enlarged portion of the first rotary member and rotatably fitted on the tubular portion of same in a manner concentric with the first rotary member. The above enlarged portion carries an annular member rigidly fitted thereon and made of a non-magnetic material. The annular member is spaced from the annular radial flange of the enlarged portion, and an armature member is fitted on the enlarged portion in a manner interposed between the flange and the annular member for axial movement therebetween. The field core and the armature member are substantially equal in outer diameter to each other. A coil spring is wound around the second rotary member and the annular member, with its one end engaging the former and its other end the latter, respectively, and operable upon energization of the coil to become wound up to grip the above members to cause driving coupling between them.

A cylindrical covering member is disposed over the second rotary member, the coil spring and the armature member, with its inner peripheral surface disposed in facing relation with the outer peripheral surfaces of these members. A securing means is provided for securing the covering member to the second rotary member while permitting adjustment of the circumferential position of the covering member relative to the second rotary member. A peripheral wall portion of the covering member positionally corresponding to an engaging protuberance formed on the outer peripheral surface of the armature member is formed with an opening in the form of a notch for instance, circumferentially extending and has a predetermined circumferential size larger than that of the above engaging protuberance. The above engaging protuberance is engaged by the opening.

The above and other objects, features and advantages of the invention will be more apparent from the ensuing detailed description taken in connection with the accompanying drawings in which:

DETAILED DESCRIPTION

A preferred embodiment of the present invention will now be described in detail with reference to the drawings.

Figure 1:
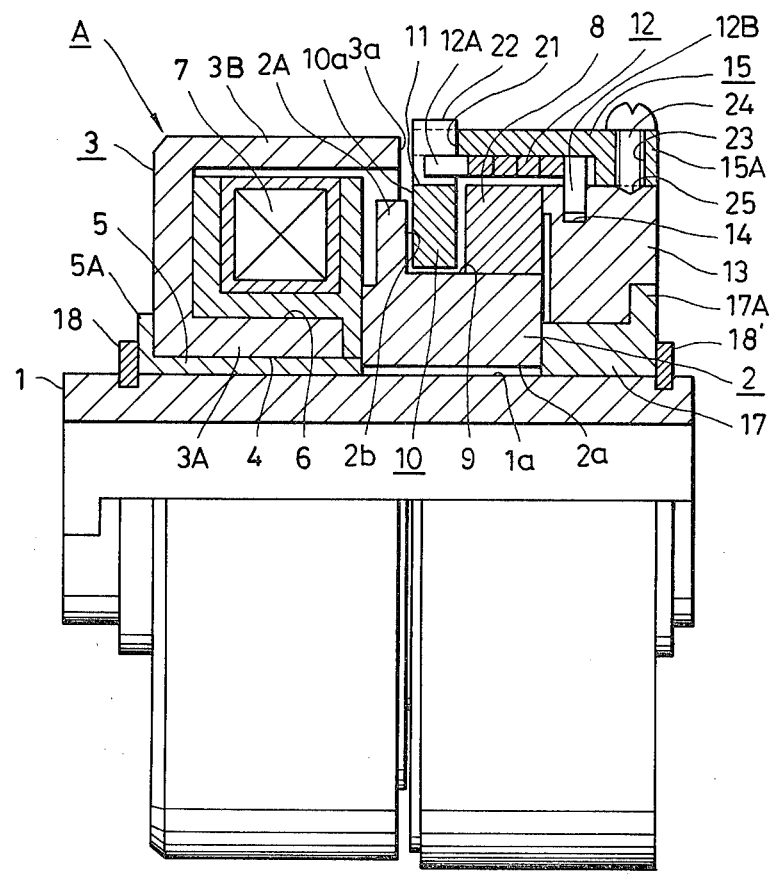
FIG. 1 is a side view of an electromagnetic spring-wound clutch according to one embodiment of the invention, with its upper half portion illustrated in longitudinal section.

Referring first to FIG. 1, symbol A designates an electromagnetic spring-wound clutch according to the invention. An output rotor 1 in the form of a hollow tubular member, which is adapted to receive an input shaft of a driven apparatus, not shown, fitted and secured therein. A hub 2 is fitted on an intermediate portion of the output rotor 1 and integrally secured thereto in a manner that the hub 2 has a serrated inner peripheral surface 2a engaging a serrated outer peripheral surface 1a of the intermediate portion of the rotor 1. The output rotor 1 and the hub 2 form an output rotary member acting in unison with each other. The output rotor 1 and the hub 2 may be formed of a single-piece member.

An annular field core 3 is arranged at one end of the hub 2, which acts as a stationary member directly fixed to a framework or the like of an apparatus, not shown, for use with the clutch. The field core 3 has a central through hole 4 through which is rotatably fitted the output rotor 1 via a radial bearing 5 formed of a plane bearing. The radial bearing 5 has its one end formed with a radial flange 5A acting as a thrust bearing.

As noted above, the output rotor 1 is intended to receive a rotary shaft of an apparatus for use with the clutch, which is to be directly fitted therein. Therefore, it can be designed to have a small outer diameter. Further, since the field core 3 is arranged on the rotor 1 in a direct manner, the half portion of the clutch on the side of the field core 3 can have its outer diameter largely reduced to a smaller value as compared with a conventional electromagnetic spring-wound clutch.

The field core 3 is formed of an annular member having an annular inner pole 3A and an annular outer pole 3B coaxially arranged with each other. Defined between the two poles is an annular recess 6 in which an electromagnetic coil 7 is accommodated, and which has an open end facing the hub 2.

One end of the hub 2 facing the field core 3 is formed integrally with an annular radial flange 2A which has a smaller outer diameter than that of the outer pole 3B of the field core 3, and which has its outer peripheral surface located radially inward of the outer pole 3B and has its greater part inserted in the annular recess 6 with its end face 2b projected slightly outwardly from the open end of the annular recess 6 which is flush with an end face 3a of the outer pole 3B located closer to the hub 2 than that of the inner pole 3A.

On the other hand, an annular member 8 having a cylindrical shape, which is made of a non-magnetic material such as stainless steel, is rigidly fitted, by means of press fit or the like, on the other end of the hub 2 remote from the field core 3. The annular member 8 is spaced from the flange 2A to define therebetween an annular recess 9 in which an armature member 10 in the form of an annular plate is axially movably fitted. The provision of the annular member 8 can increase the degree of magnetic attraction of the armature member 10 to the flange 2A without increasing the axial sizes of the annular recess 9 and the armature member 10.

The armature member 10 and the field core 3 have almost the same outer diameter. That is, the armature member 10 is fitted on the hub 2 which is integrally fitted on the output rotor 1 having a small outer diameter and accordingly has a correspondingly small outer diameter, so that it can have almost the same outer diameter with the field core 3 while maintaining its area of engagement with the flange 2A at a value equal to or even more than a conventional value. The armature member 10 is disposed in direct facing relation with both the field core 3 and the flange 2A with an outer portion of its end face 10a directly facing the end face 3a of the outer pole 3B of the field core 3 and an inner portion of same the end face 2b of the flange 2A, respectively.

An annular rotor 13 acting as an input rotary member is rotatably supportedly fitted on one end portion of the output rotor 1 via a radial plane bearing 17 having a thrust bearing flange 17A similar to the flange 5A of the bearing 5. This input rotor 13 is disposed in facing relation with end faces of the hub 2 and the annular member 8 remote from the field core 3. It is adapted to be coupled at its outer end face to a suitable driving force transmitting member, not shown, such as a pulley.

A coil spring 12 is wound around the outer peripheries of the annular member 8 and the input rotor 13 for gripping engagement therewith, with its one end 12A engaged in a notch 11 formed in the outer periphery of the armature member 10 and its other end radially inwardly bent and engaged in a blind hole 14 formed in the outer periphery of the input rotor 13.

The annular member 8 serves as a trunk portion of the hub 2 facing an inner peripheral surface of the coil spring 12, on which the coil spring 12 is grippingly wound up. Since also this annular member 8 can be designed to have a small outer diameter due to its direct arrangement on the small-sized hub 2, which, in the illustrated embodiment, is equal to the outer diameter of the input rotor 13 so that its outer peripheral surface is flush with that of the rotor 13.

Snap rings 18, 18' are fitted in the outer rotor 1 in contact with the opposite outer end faces of the respective bearings 5, 17 for preventing axial dislocation of the component parts of the clutch.

Figure 2:
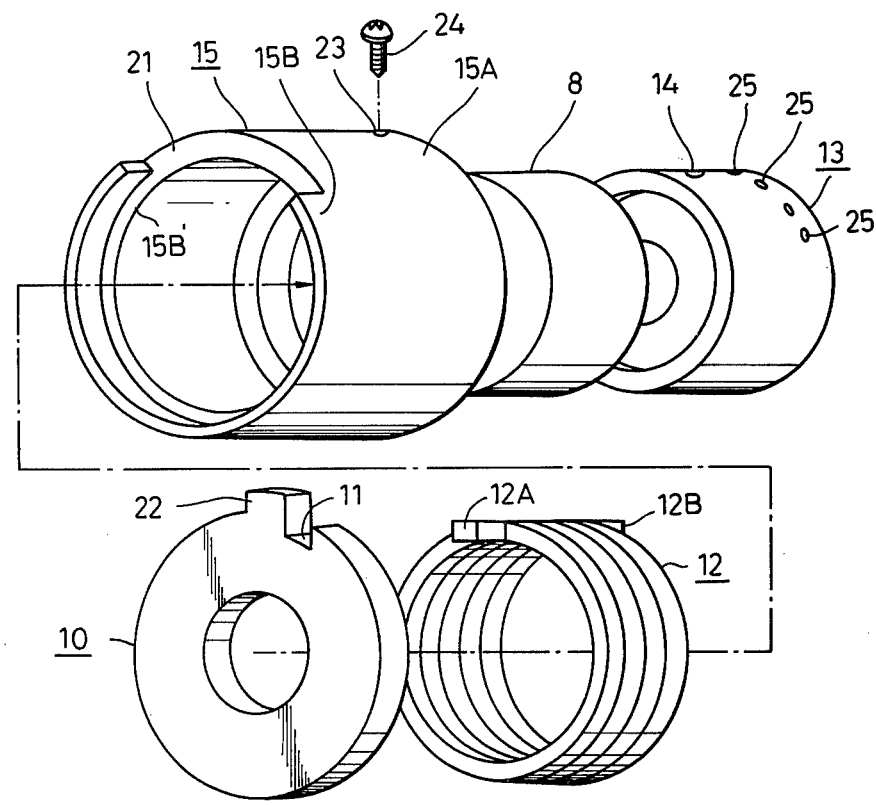
FIG. 2 is an exploded perspective view of part of the component parts of the clutch in FIG. 1.

A cylindrical cover 15 is concentrically mounted on the outer periphery of the input rotor 13 and secured thereto at its end 15A. The cover 15 has its inner peripheral surface facing the outer peripheral surfaces of the coil spring 12 and the armature member 10 so that the coil spring 12 in a non-gripping state is kept in urging contact with the inner peripheral surface of the cover 15. As more clearly shown in FIG. 2, the cover 15 has another end portion 15B facing the outer peripheral surface of the armature member 10 and formed with a circumferentially extending notch 21 at a predetermined circumferential location and having a predetermined circumferential size. The above end portion 15B has an inner peripheral surface formed with an annular stepped shoulder 15B' for guiding the armature member 10 therealong.

The cover 15 is fitted on the input rotor 13 in a manner adjustable in circumferential position. More specifically, engaged by an end edge of the above notch 21 is an engaging protuberance 22 formed on the outer peripheral surface of the armature member 10 at a location adjacent the notch 11. The predetermined circumferential size of the notch 21 is much larger than that of the engaging protuberance 22. A tapped hole 23 is formed in the end portion 15A of the cover 15 at a predetermined circumferential position. Threadedly fitted in this hole 23 is a fastening screw 24 which has its tip engaged in a selected one of a plurality of recesses 25 formed in the outer peripheral surface of the input rotor 13 and circumferentially arranged. Alternatively of this arrangement, a plurality of tapped holes 23 may be formed in the end portion 15A of the cover 15, and a single recess 25 may be formed in the outer peripheral surface of the input rotor 13.

The operation of the electromagnetic spring-wound clutch according to the invention is as follows: When an electric voltage is applied to the electromagnetic coil 7, the armature member 10 is magnetically attracted and drawn toward the field core 3 to have its end face 10a brought into frictional engagement with the end face 2b of the flange 2A of the hub 2 to obtain driving coupling between the armature member 10 and the hub 2. At this instant, the coil spring 12 becomes wound up to a smaller diameter to grip the annular member 8 forming the trunk portion of the hub and the input rotor 13.

After the above gripping coupling of the annular member 8 and the input rotor 13 by means of the coil spring 12, the input rotor 13 and the hub 2 rotate in unison with each other so that torque is transmitted from the input rotor 13 to the output rotor 1 which rotates in unison with the hub 2.

Then, the manner of adjusting the coupling period of time of the clutch according to the invention will now be described. Adjustment of the coupling period of time is made by changing the clearance between the inner peripheral surface of the coil spring 12 in a non-gripping state and the outer peripheral surface of the annular member 8. To be concrete, first the screw 24 is loosened, and then the cover 15 is rotated so as to cause rotation of the armature member 10 in a direction causing expansion of the coil spring 12 or in a direction causing contraction of same. When the clearance between the inner peripheral surface of the coil spring 12 and the outer peripheral surface of the annular member 8 has been adjusted to a desired value, the tapped hole 23 of the cover 15 is brought into alignment with one of the recesses 25 in the input rotor 13 which is then the closest to the hole 23, followed by screwing the screw 24 through the hole 23 into the above recess 25, thus completing the adjustment.

For instance, if during the adjustment the armature member 10 is rotated in a direction causing contraction of the coil spring 12 so as to shorten the coupling period of time, the coil spring 12 is kept in a pretensioned state with a reduced diameter, the driving coupling of the hub and the second rotary member can be finished in a very slight time after the magnetic frictional engagement of the armature member 10 with the flange 2A.

Although in the embodiment described above, the rotor 1 and the rotor 2 were described as an output rotary member and an input rotary member, respectively, the former can be used as an input rotary member, and the latter as an output rotary member, respectively, in a reverse manner, without changing the illustrated arrangement at all, like a conventional electromagnetic spring-wound clutch of this kind.

Obviously many modifications and variations of the present invention are possible in the light of the above teachings. It is therefore to be understood that within the scope of the appended claims the invention may be practiced otherwise than as specifically described.

What is claimed is:

1. An electromagnetic spring-wound clutch comprising: a first rotary member having a tubular portion and an annular enlarged portion radially outwardly extending from said tubular portion at an intermediate location thereof, said enlarged portion being directly fitted on said tubular portion and secured thereto for rotation in unison therewith and having one end thereof formed with a radially extending annular flange; a stationary field core arranged at said one end of said enlarged portion of said first rotary member, said field core having a central through hole through which said tubular portion of said first rotary member is rotatably fitted in a manner concentric with said field core; and electromagnetic coil carried by said field core; a second rotary member arranged at the other end of said enlarged portion of said first rotary member and rotatably disposed around and fitted on said tubular portion of said first rotary member in a manner concentric with said first rotary member, said enlarged portion of said first rotary member being smaller in outer diameter than said second rotary member; a non-magnetic annular member disposed around and rigidly fitted on an outer periphery of said enlarged portion of said first rotary member at a location spaced from said annular flange, for rotation in unison with said first rotary member; said non-magnetic annular member having substantially the same outer diameter with said second rotary member; an annular armature member disposed around said enlarged portion of said first rotary member and fitted in an annular recess defined between said annular flange and said non-magnetic annular member for axial movement therebetween, said armature member being substantially equal in outer diameter to said field core, said non-magnetic annular member being smaller in outer diameter than said armature member; said annular flange being located closer to said armature member than an end face of said field core associated therewith; and a coil spring wound on outer peripheries of said second rotary member and said non-magnetic annular member, said coil spring having one end engaging said second rotary member and the other end said armature member, respectively; whereby energization of said electromagnetic coil causes magnetic attraction of said armature member toward said annular flange of said enlarged portion of said first rotary member into frictional engagement with said first rotary member, said frictional engagement of said armature member with said first rotary member causing gripping engagement of said coil spring with said second rotary member and said non-magnetic annular member to achieve driving coupling of said first and second rotary members.

2. The electromagnetic spring-wound clutch as claimed in claim 1, further comprising a cylindrical covering member having an inner peripheral surface disposed in facing relation with outer peripheral surfaces of said second rotary member; and said coil spring and said armature member, and means for securing said covering member to said second rotary member in a manner permitting adjustment of the circumferential position of said covering member relative to said second rotary member; said armature member having a radially outwardly extending engaging protuberance; and said covering member having a peripheral wall portion positionally corresponding to said engaging protuberance of said armature member and formed with an opening at a predetermined circumferential location and having a predetermined circumferential size larger than that of said engaging protuberance of said armature member, said engaging protuberance being engaged by said opening of said covering member.

3. An electromagnetic spring-wound clutch comprising: a first rotary member having a tubular portion and an annular enlarged portion radially outwardly extending from said tubular portion at an intermediate location thereof, said enlarged portion having one end thereof formed with a radially extending annular flange; a stationary field core arranged at said one end of said enlarged portion of said first rotary member, said field core having a central through hole through which said tubular portion of said first rotary member is rotatably fitted in a manner concentric with said field core; an electromagnetic coil carried by said field core; a second rotary member arranged at the other end of said enlarged portion of said first rotary member and rotatably fitted on said tubular portion of said first rotary member in a manner concentric with said first rotary member; a non-magnetic annular member rigidly fitted on said enlarged portion of said first rotary member at a location spaced from said annular flange; an annular armature member fitted on said enlarged portion of said first rotary member at a location between said annular flange and said non-magnetic annular member for axial movement therebetween, said armature member being substantially equal in outer diameter to said field core; said annular flange being located closer to said armature member than an end face of said field core associated therewith; a coil spring wound on said second rotary member and said non-magnetic annular member, said coil spring having one end engaging said second rotary member and the other end said armature member, respectively; a cylindrical covering member having an inner peripheral surface disposed in facing relation with outer peripheral surfaces of said second rotary member, said coil spring and said armature member; and means for securing said covering member to said second rotary member in a manner permitting adjustment of the circumferential position of said covering member relative to said second rotary member; said armature member having a radially outwardly extending engaging protuberance; and said covering member having a peripheral wall portion positionally corresponding to said engaging protuberance of said armature member and formed with an opening at a predetermined circumferential location and having a predetermined circumferential size larger than that of said engaging protuberance of said armature member, said engaging protuberance being engaged by said opening of said covering member; whereby energization of said electromagnetic coil causes magnetic attraction of said armature member toward said annular flange of said enlarged portion of said first rotary member into frictional engagement with said first rotary member, said frictional engagement of said armature member with said first rotary member causing gripping engagement of said coil spring with said second rotary member and said non-magnetic annular member to achieve driving coupling of said first and second rotary members.

4. The electromagnetic spring-wound clutch as claimed in claim 3, wherein said non-magnetic annular member and said second rotary member are substantially equal in outer diameter to each other.

5. The electromagnetic spring-wound clutch as claimed in claim 1 or claim 3, wherein said field core comprises an annular member formed of an annular inner pole and an annular outer pole arranged concentrically with each other, said inner pole and said outer pole defining therebetween an annular recess having an open end facing said enlarged portion of said first rotary member and accommodating therein said electromagnetic coil, said annular flange of said enlarged portion of said first rotary member being smaller in outer diameter than said outer pole of said field core and partially located in said annular recess of said field core, said annular flange having an end face remote from said field core and located closer to said armature member than said associated end face of said field core, said armature member having an end face disposed in direct facing relation with an end face of said outer pole of said field core and said end face of said annular flange.

6. The electromagnetic spring-wound clutch as claimed in claim 5, wherein said tubular portion of said first rotary member is fitted through said central through hole of said field core via a radial plane bearing.

7. The electromagnetic spring-wound clutch as claimed in claim 5, wherein said second rotary member is fitted on said tubular portion of said first rotary member via a radial plane bearing.

8. The electromagnetic spring-wound clutch as claimed in claim 1 or claim 3, wherein said tubular portion of said first rotary member is fitted through said central through hole of said field core via a radial plane bearing.

9. The electromagnetic spring-wound clutch as claimed in claim 1 or claim 3, wherein said second rotary member is fitted on said tubular portion of said first rotary member via a radial plane bearing.

10. The electromagnetic spring-wound clutch as claimed in claim 2 or claim 3, wherein said securing means comprises a first hole formed in one of said covering member and said second rotary member, a plurality of second holes formed in the other one of said covering member and said second rotary member at a location positionally corresponding to said first hole and circumferentially arranged, and a fastening member removably engaged in said first hole and a selected one of said second holes.

11. The electromagnetic spring-wound clutch as claimed in claim 10, wherein said fastening member is in threaded engagement with at least one of said first hole and said selected one of said second holes.

* * * * *

UNITED STATES PATENT AND TRADEMARK OFFICE
CERTIFICATE OF CORRECTION

PATENT NO. : 4,465,171
DATED : August 14, 1984
INVENTOR(S) : Kinichi KOYAMA

It is certified that error appears in the above-identified patent and that said Letters Patent is hereby corrected as shown below:

COLUMN 6, line 41, after "said field core;" change "and" to

--an--;

COLUMN 7, lines 15 and 16, change "rotary member; and said coil spring and said armature member, and means"

to --rotary member, said coil spring and said armature member; and means--.

Signed and Sealed this

Twenty-sixth Day of March 1985

[SEAL]

Attest:

DONALD J. QUIGG

Attesting Officer        Acting Commissioner of Patents and Trademarks